United States Patent [19]

Talks et al.

[11] Patent Number: 4,779,030
[45] Date of Patent: Oct. 18, 1988

[54] TELEVISION LINE OUTPUT CIRCUIT

[75] Inventors: Raymond Talks, Croydon, England; Thaddaeus E. Bruton, Nijmegen, Netherlands

[73] Assignee: U S. Philips Corp., New York, N.Y.

[21] Appl. No.: 68,861

[22] Filed: Jul. 2, 1987

[30] Foreign Application Priority Data

Jul. 18, 1986 [GB] United Kingdom ................. 8617585

[51] Int. Cl.$^4$ ........................ H01J 29/70; H01J 29/76
[52] U.S. Cl. ..................................... 315/408; 315/371
[58] Field of Search ............................... 315/371, 408

[56] References Cited

U.S. PATENT DOCUMENTS

| 4,184,104 | 1/1980 | Shouse, Jr. ............... | 315/371 |
| 4,254,365 | 3/1981 | Knight ...................... | 315/371 |
| 4,594,534 | 6/1986 | Haferl ....................... | 315/371 |

Primary Examiner—Theodore M. Blum
Attorney, Agent, or Firm—Gregory P. Gadson

[57] ABSTRACT

A television line output circuit includes a first sawtooth network with a diode (D), a trace capacitor (Ct), a retrace capacitor (Cr) and a line deflection coil (Ly), and a second sawtooth network with a diode (D'), a trace capacitor (C't), a retrace capacitor (C'r) and a coil (L'). The diodes (D, D') are connected in series and the two sawtooth networks connected across a line output transistor (Tr). A first modulation source (M1) is connected across the trace capacitor (C't) in the second sawtooth network to modulate the line deflection current to overcome East-West pin-cushion distortion. A resistor (R) of low ohmic value is connected between the anode of the diode (D') in the second sawtooth network and earth and a second modulation source (M2) is connected across this resistor (R). The second modulation source (M2) provides a signal dependent on beam current to correct for display errors at line frequency rate as they occur.

12 Claims, 2 Drawing Sheets

TELEVISION LINE OUTPUT CIRCUIT

BACKGROUND OF THE INVENTION

The invention relates to a circuit arrangement for generating a line frequency sawtooth deflection current having a trace period and retrace period through a deflection coil, said arrangement including a first sawtooth network comprising a first diode, said deflection coil, a trace capacitor and a retrace capacitor, a second sawtooth network comprising a second diode, a second coil, a second trace capacitor and a second retrace capacitor, the retrace period for the current when flowing through the second coil being approximately equal to the retrace period for the deflection coil, the arrangement also including supply terminals for receiving a supply voltage from a source and a controlled switching arrangement which is non-conducting during the retrace period, said sawtooth networks being connected together such that the first and second diodes are connected in series with the same conductivity direction, the series arrangement of the diodes being coupled to the controlled switching arrangement, and control means for varying the voltage across one of the trace capacitors.

Such an arrangement is disclosed in United Kingdom Patent Specification No. 1 459 922, the arrangement principally being used to correct for East-West pincushion distortion in television displays where the control means causes a parabolic voltage variation at field rate to be present across one of the trace capacitors, in practice the second trace capacitor. This mentioned Patent Specification also contemplates further corrections being applied to the circuit arrangement, such as for changes in the supply voltage, these further corrections being at a relatively low rate compared with the line frequency and being effective across a third trace capacitor in a third sawtooth network. It has been found that if it is desired to insert an information or correction signal having a rate of the order of the line frequency into the circuit arrangement this cannot readily be achieved by the above arrangement, even if modified with a third sawtooth network as this higher frequency signal would either be impeded by the reactance of the relevant coil while if it were not so impeded it would not produce the desire reaction during the line period in which it is applied owing to the action of the relevant clamping diode.

SUMMARY OF THE INVENTION

It is an object of the invention to provide a circuit arrangement of the type described in the opening paragraph in which it is possible to insert a signal having a rate corresponding to that of the line frequency.

The inention provides a circuit arrangement for generating a line frequency sawtooth deflection current having a trace period and retrace period through a deflection coil, said arrangement including a first sawtooth network comprising a first diode, said deflection coil, a trace capacitor and a retrace capacitor, a second sawtooth network comprising a second diode, a second coil, a second trace capacitor and a second retrace capacitor, the retrace period for the current when flowing through the second coil being approximately equal to the retrace period for the deflection coil, the arrangement also including supply terminals for receiving a supply voltage from a source and a controlled switching arrangement which is non-conducting during the retrace period, said sawtooth networks being connected together such that the first and second diodes are connected in series with the same conductivity direction, the series arrangement of the diodes being coupled to the controlled switching arrangement, and first control means for varying the voltage across one of the trace capacitors, characterized in that an impedance is provided in series with the diode in one of the sawtooth networks such that it is present in the series arrangement of the first and second diodes, and second control means for varying the voltage across the said impedance.

With such an arrangement the voltage to which the diode associated with the impedance is connected is varied such that the voltage at the junction of the two sawtooth networks follows these variations and is effective during the line period in which it is applied.

When the first control means varies the voltage across one of the trace capacitors at field or a lower frequency for correcting a display error then the invention may be further characterized in that the second control means varies the voltage across the impedance at the line frequency for correcting a further display error. This has the advantage that errors which are at line frequency rate can be corrected which was not possible with the previous arrangement.

With an additional characteristic of the invention the second control means may comprise means for producing a signal representing variations in the beam current of a cathode ray display tube associated with the circuit arrangement, means for filtering components at the retrace frequency from said signal and means for applying the resulting filtered signal to the junction of the impedance with its associated diode. This has been found to correct for errors produced when a crosshatch pattern or the like are displayed.

In a preferred embodiment where the first control means varies the voltage across the trace capacitor in the second sawtooth network, the arrangement may be characterized in that the impedance is connected to the diode in that second sawtooth network.

When the signal representing variations in the beam current is derived from a capacitor carrying the alternating components of the beam current the invention may be further characterised in that means for differentiating the filtered signal is connected between the means for filtering the said retrace frequency components and the said junction. The differentiating means overcomes the integrating action of the capacitor.

BRIEF DESCRIPTION OF THE DRAWINGS

The above and other features of the invention will now be described, by way of example, with reference to the accompanying drawings in which.

DETAILED DESCRIPTION OF THE INVENTION

Figure 1:
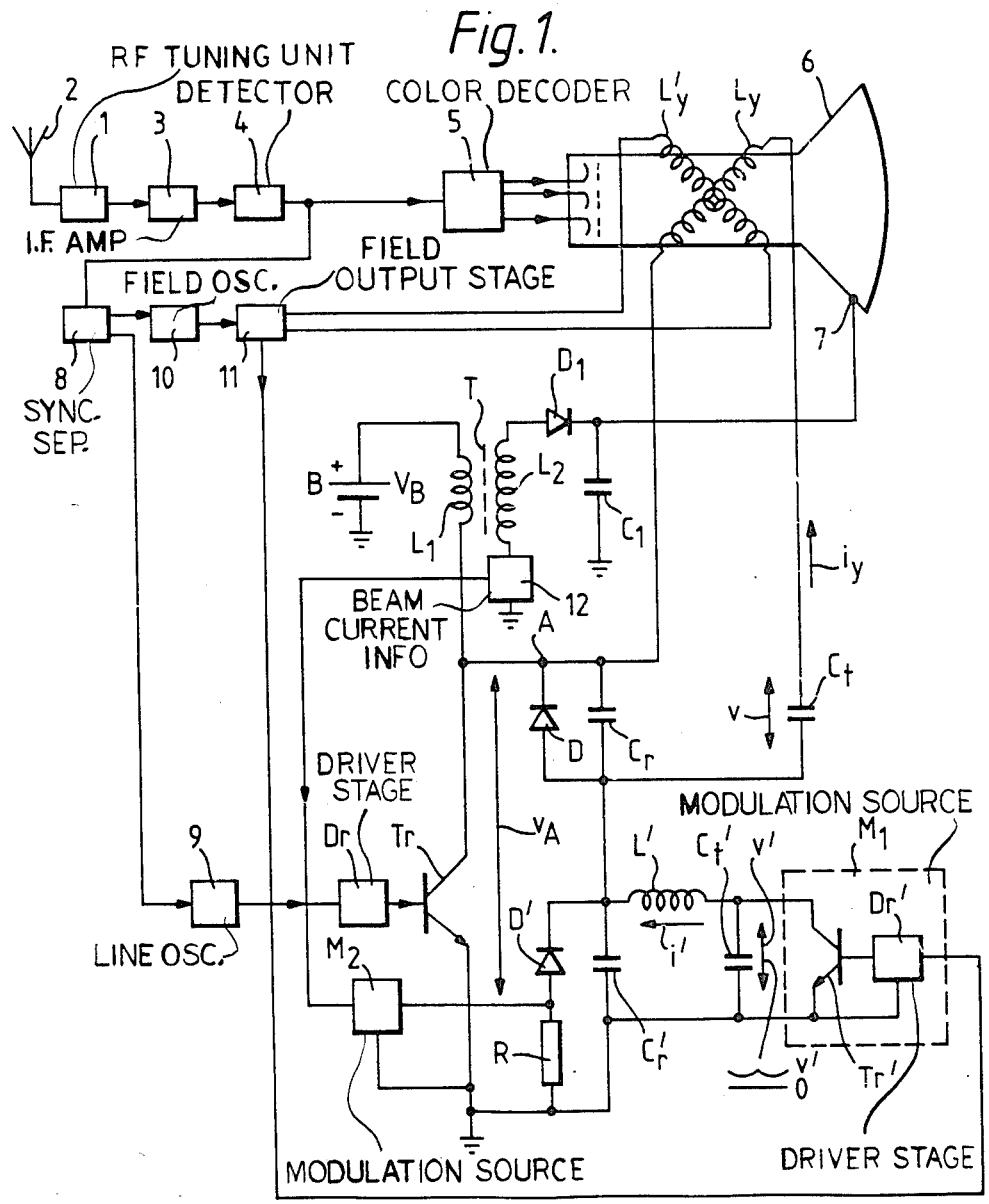
FIG. 1 shows a television display apparatus with a first embodiment of the circuit arrangement according to the invention.

The television display apparatus of FIG. 1 has an RF tuning unit 1 for connection to an aerial 2, an IF amplifier 3, a detector 4 and a video amplifier with a color decoder 5 which applies the color signals to a color display tube 6. This tube has an acce anode 7 and is provided with a coil Ly for the horizontal (line frequency) deflection and a coil L'y for the vertical (field frequency) deflection.

Line synchronizing pulses, which are applied to a line oscillator 9, are separated by means of a sync. separator 8 from the output signal of the detector 4, while separated field synchronizing pulses are applied to a field oscillator 10. Oscillator 10 controls a field output stage 11 which supplies the field deflection current to the coil L'y. Line oscillator 9 controls a driver stage Dr which applies line switching pulses to a controlled switching arrangement, for example, a switching transistor Tr of a line deflection output circuit to be further described and which provides the line deflection circuit for the coil Ly.

A trace capacitor Ct is arranged in series with line deflection coil Ly while a diode D with the given conductivity direction and a retrace capacitor Cr are connected in parallel with the series arrangement thus constituted. Capacitor Cr may alternatively be arranged in parallel with coil Ly. These four circuit elements form a first sawtooth network and represent the main components of the line deflection section. This section may be provided additionally, for example, in known manner with one or more transformers for mutual coupling of the elements, with circuits for centering and linearity correction and the like.

One (the lower) end or a tap of a primary winding L1 of a transformer T is connected to the collector of transistor Tr which is of the npn type and is connected to the junction A of elements D, Cr and Ly. The positive terminal of a direct voltage source B whose negative terminal is connected to earth is connected to the other (upper) end of winding L1.

The ends of element D, CR and Ct not connected to deflection coil Ly are connected to the junction of a diode D', a capacitor C'r and a coil L'. A capacitor C't is arranged in series with coil L', the free ends of elements C'r and C't being connected to earth. The conductivity direction of diode D' is the same as that for diode D, the anode of diode D' being connected to earth through a resistor R of a low ohmic value. Ignoring resistor R, elements D', L', C'r and C't form a second sawtooth network which is of the same as or the equivalent of the network constituted by the elements D, Ly, Cr and Ct, but optionally at a different impedance level.

A modulation source M1 is arranged in parallel with the capacitor C't. This modulation source includes a transistor Tr' whose emitter is connected to ground and whose collector is connected to the junction of coil L' and capacitor C't, as well as a driver stage Dr' controlling the base electrode of Tr' which stage has its input connected to the field output stage 11. Driver stage Dr' derives from the signals of the field output stage a field frequency parabolically varying modulation control signal, which control signal serves to provide for East-West raster correction in the line deflection current. This signal varies at the field frequency but may be considered to be constant during a line period. Since the raster distortion to be corrected is generally pin-cushion shaped it is known that the introduced modulation must be such that the amplitude of the line deflection current varies in a parabolic manner over a field period while the peak (maxima) of the parabola occurs in the middle of the field trace time.

Other windings across which voltages are present serving as supply voltages for other parts of the television display apparatus are wound on the core of transformer T. One of these windings, winding L2 is shown in FIG. 1 and generates the EHT for the acceleration anode 7 of television display tube 6 with the aid of an EHT rectifier D1 across a smoothing capacitance C1. The auxiliary supply voltages thus obtained and the EHT must not be subjected to the same field frequency modulation as the line deflection current.

After the commencement of the trace (line scan) period diodes D and D' conduct. The voltage across capacitors Ct and C't is applied to coil Ly and L', respectively, so that a sawtooth current flows through each coil. The current iy through coil Ly is the line deflection current. Before the middle of the trace period the base of transistor Tr receives a control signal so that it is rendered conducting. Approximately in the middle of the trace period the two currents reverse their direction. If current iy is larger than the current i' through coil L', current iy flows through transistor Tr, while the difference iy−i' flows through diode D'. Diode D is connected in parallel with the series arrangement of the transistor Tr (being in the bottomed state) and diode D' and as the mean voltage across diode D is substantially zero it does not conduct. In the reverse case in which current i' is larger than current iy, current i' flows through transistor Tr and the difference i'−iy flows through diode D and diode D' then does not conduct.

At the end of the trace period transistor Tr and hence the diode which was conducting are cut off. A substantially sinusoidal retrace (flyback) voltage is produced across capacitors Cr and C'r. At the instant when these voltages become zero again diode D and D' simultaneously become conducting: this is the commencement of a new trace period. The condition therefor, is that the retrace periods determined by diodes D and D' and elements Cr, Ly, Ct and C'r, L', C't are substantially equal, which is the case when the resonant frequencies of the individual networks are equal, whereby the retrace period is a known function of the resonant frequency.

Since transistor Tr' is connected in parallel with capacitor C't there is, as it were, a field frequency varying load on the voltage v' present across this capacitor. When the capacitance of this capacitor is chosen to be such that its impedance at field frequency is not negligibly small relative to the output impedance of source M1, voltage v' and also the voltage v across capacitor Ct will vary at the field frequency, provided that capacitor Ct is chosen in the same manner as capacitor C't. The sum of the mean values of voltages v and v' is in fact equal to the voltage $V_B$ of source B since no direct voltage can remain present across the inductors L1, Ly and L'. The amplitude of current iy undergoes the same variation as the voltage v. The control signal for transistor Tr' must be such that voltage v and consequently the field frequency envelope of current iy has the above-mentioned desired shape.

Voltage v is substantially equal to the mean value of the voltage present across capacitor Cr and is proportional to the retrace voltage thereacross. Voltage v' is also substantially equal to the mean value of the voltage present across capacitor C'r and is proportional to the retrace voltage thereacross. As already stated, the retrace periods of networks D, Cr, Ly, Ct and D', C'r, L', C't are substantially equal. Both retrace voltages are therefore equal in frequency and shape and both proportionality constants are equal. The voltage $v_A$ at point A is equal to the sum of the voltages present across capacitors Cr and C'r and the peak value of voltage $v_A$ relative to its mean value i.e. the voltage $V_B$ of source B, is in the same relation as are the retrace voltages across the capacitors Cr and C'r relative to voltages v and v'. If voltage $V_B$ is constant, the peak value of voltage $v_A$ is also constant. It follows that the amplitude of the voltage present across winding L1 is also constant which means that the EHT on electrode 7 as well as the auxiliary supply voltages do not undergo a field frequency modulation in spite of the modulation of deflection current iy.

The variation of voltage v' is opposite to that of the voltage v so that voltage v' must be minimum in the middle of the field trace time. The same result as above may alternatively be achieved by not providing the modulation source in parallel with the capacitor C't but with capacitor Ct in which the polarity of the control signal of transistor Tr' must be reversed relative to the control signal for FIG. 1. Another modification is that in which transistor Tr' is not provided as a varying load but as a current or voltage source. The latter case occurs when transistor Tr' is arranged, for example, as an emitter follower.

In practice the ratio between the inductances of coils Ly and L' will be chosen to be approximately equal to the ratio of the mean trace voltages which are desired thereacross. When for example the total trace voltage v+v' is approximately 150 volts, the inductance of coil L' may be equal to a quater of that of coil Ly in case of a mean direct voltage component of voltage v' of approximately 30 V, a practical example being approximately 270 μH and 1.2 mH. By adjusting the direct voltage component of voltage v' the width of the picture displayed is adjusted while the amplitude of the field frequency component is adjusted to provide an undistorted picture.

So far in the above description the reason for the presence of the resistor R, which is connected between the anode of diode D' and earth, has not been considered. The junction between this resistor and diode is connected to the output of a second modulation source M2 whose input is connected to a circuit 12 which is itself connected between the lower end of the EHT winding L2 and earth. The circuit 12 provides beam current information which can be used for limiting purposes and in its simplest form circuit 12 comprises a resistor. In the present arrangement the output from circuit 12 is used as a place for deriving a sensing signal to overcome raster defects which occur when the beam current changes from a high level in one or more scanning lines to a low level in the immediately following scanning lines. Such a raster defect is most noticeable with a white cross-hatch pattern on a black background especially with current flat and square television display tubes such as that known as 45AX of Mullard Limited. The raster defect appears as a modulation of the scanning line length for a given number of lines following a bright line of the cross-hatch pattern and there is a modulation of the EHT supply derived from the line output stage. The defect and its cause is described in U.S. Pat. No. 4,184,104. Consideration was given to applying a correcting signal for this defect across capacitor C't in the same manner as the correction for pincushion distortion but it was found that the reactance of the coil L' was such as to impede this line rate correcting signal from providing the required correction. Apart from this it was appreciated that in the normal circuit without the resistor R the diode D' would be conducting during each line scan period so that its cathode and those components connected to it would be at earth potential so preventing a line frequency correcting signal effecting a correction during the line scan period in which it is applied and required. This is overcome with the present arrangement where the correcting signal is applied across the resistor R to produce a voltage across the resistor which is modulated at line rate. During each line scan period when diode D' is conducting the modulated voltage is present at its cathode and those components connected to it so imposing this additional modulation on the first sawtooth network. In the case where circuit 12 is formed by a resistor the modulation source M2 comprises a filter for filtering out the flyback (retrace) frequency components present thereacross, and a driver amplifier with a low output impedance for applying the correcting signal across the low value resistor R.

Figure 2:
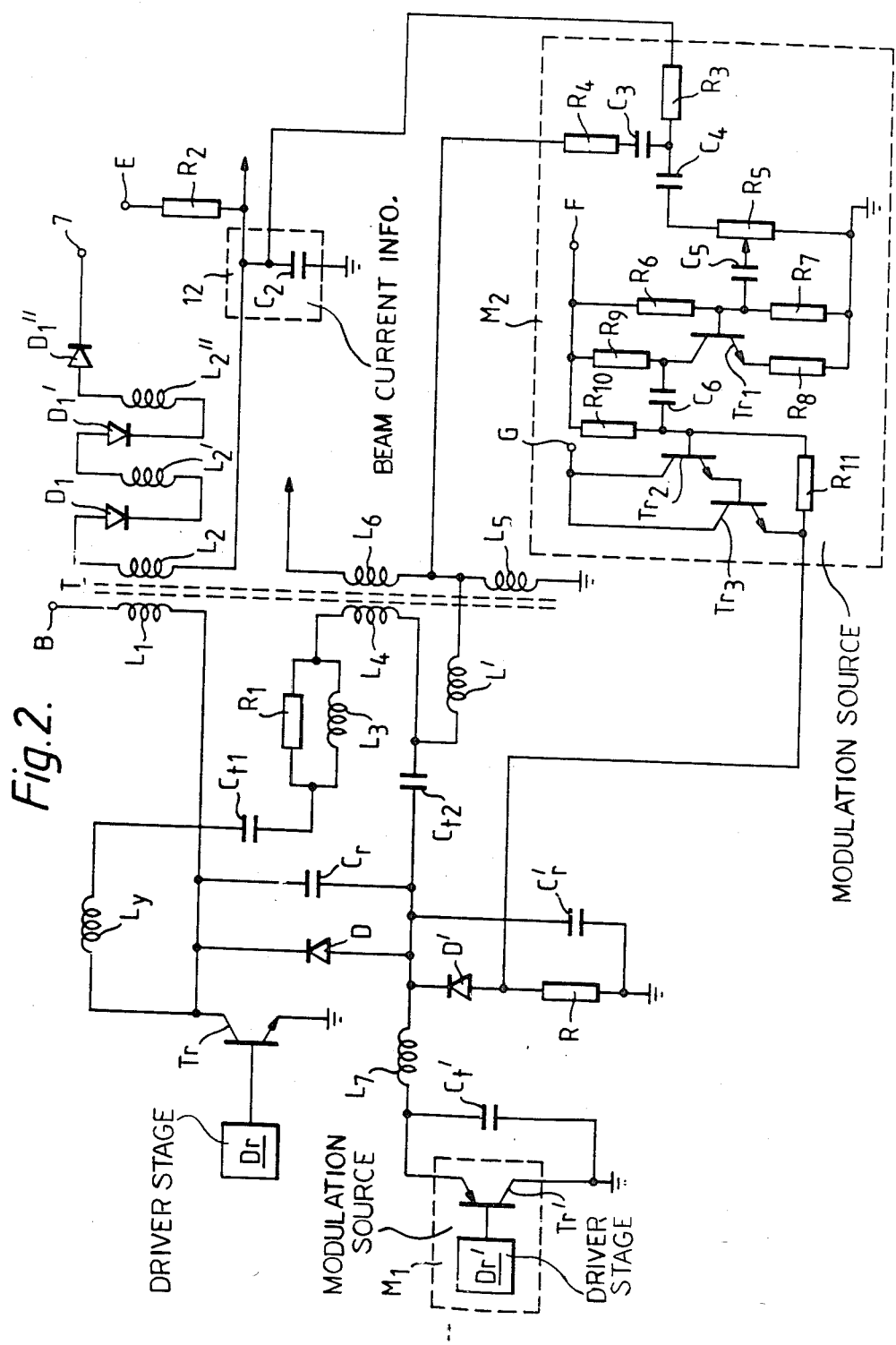
FIG. 2 shows a further embodiment of the circuit arrangement according to the invention.

FIG. 2 shows a modification of parts of the apparatus of FIG. 1 some of which parts are shown in greater detail. Corresponding reference symbols used in FIG. 2 to those used in FIG. 1 indicate like components. The EHT winding L2 on the transformer T is replaced by three windings L2, L2' and L2' wound over each other with the windings being connected by means of diodes D1 and D1', the final winding L2" being connected to a final diode D1". These windings and diodes form an EHT generator of the diode split type. The trace capacitor Ct, which also provides 'S' correction is replaced by two capacitors Ct1 and Ct2 which are connected through a linearity corrector comprising a coil L3 and a parallel resistor R1, and a further winding L4 on the transformer T. The junction of winding L4 and capacitor Ct2 is connected through the coil L' to the junction of two further windings L5 and L6 on the transformer T, the other end of winding L5 being connected to earth while the other end of winding L6 is connected to a rectifier (not shown) to provide a low voltage supply for other parts of the apparatus. The connection of the capacitors Ct1 and Ct2 provides an improvement in the 'S' correction which is modulated at field rate required for display tubes of the flat and square type. The modulation from the first modulation source M1 is shunt fed into the second sawtooth network via an inductor L7 which acts as a blocking impedance at line frequency.

The circuit 12 in FIG. 2 comprises a capacitor C2 which provides an average of the beam current for beam current limiting circuits of the type in current use.

The junction of winding L2 and capacitor C2 is connected through a resistor R2 to a terminal E for a low voltage supply (typically 26 volts). This junction is also connected to the input of the second modulation source M2 through a resistor R3 to two capacitors C3 and C4, capacitor C3 being connected through a resistor R4 to the junction of windings L5 and L6 while capacitor C4 is connected through a potentiometer R5 to earth. Capacitor C3 is a blocking capacitor and receives from the junction of windings L5 and L6 a signal at flyback frequency in order to cancel flyback frequency components in the signal taken from capacitor C2. Components C4, R5 form a differentiation circuit which is required as the correction signal derived from the second modulation source M2 needs to be proportional to the beam current whereas that derived from capacitor C2 is the integral of the beam current. The output from the potentiometer R5, which may be varied, is applied through an isolating capacitor C5 to the base of a transistor Tr1 which is biased by a potential divider formed by resistors R6 and R7 connected between a high voltage supply rail, whose terminal F is typically at 140 volts, and earth. The emitter of transistor Tr1 is connected to earth through a resistor R8 while the collector is connected to the high voltage supply rail through a further resistor R9. Transistor Tr1 and its associated components form a driver amplifier the output of which is derived from its collector via a capacitor C6 and applied to an emitter-follower output stage comprising Darlington connected transistors Tr2 and Tr3 whose collectors are connected to a further low voltage supply, whose terminal G is typically at 13 volts. The base of transistor Tr2 is biased from a potential divider comprising resistors R10 and R11 respectively connected between the high voltage supply rail (terminal G) and the emitter of transistor Tr3. The emitter of transistor Tr3 is also connected to the junction between resistor R and diode D' to provide the required line frequency modulation.

In a practical version of the circuit of FIG. 2 the following components were employed:

| | | | |
|---|---|---|---|
| Cr | 9.1 nF | R | 1 ohm |
| C'r | 22 nF | R1 | 430 ohms |
| Ct1 | 390 nF | R2 | 100k ohms |
| Ct2 | 390 nF | R3 | 82 ohms |
| | | R4 | 47k ohms |
| C't | 1 micro F | R5 | 22k ohms |
| C2 | 22 nF | R6 | 1.4M ohms |
| C3 | 100 nF | R7 | 39k ohms |
| C4 | 1 nF | R8 | 3.3k ohms |
| C5 | 470 nF | R9 | 100k ohms |
| | | R10 | 1M ohms |
| C6 | 270 nF | R11 | 4.7k ohms |
| L' | 11 mH | Tr | BU 508 Mullard/Phillips |
| | 3112 338 30920 Philips | | |
| Ly | DT 6010 Mullard/Philips | Tr' | BD 234 Mullard/Philips |
| L3 | AT 4042/30 Mullard/Philips | Tr1 | BC 546 Mullard/Philips |
| L7 | 11 mH | Tr2 | BC 547 Mullard/Philips |
| | 3112 338 30530 Philips | Tr3 | BD 233 Mullard/Philips |
| T | Diode Split Line Transformer 3122 138 36830 Philips | | |

Although in the above description reference has been made to a particular form of raster defect which appears as a modulation of the scanning line length for a given number of lines following a bright line of a cross hatch pattern, it will be appreciated that other forms of raster defect can be corrected with the present invention-in particular those that require a correction at line frequency.

We claim:

1. A circuit arrangement for generating a line frequency sawtooth deflection current having a trace period and retrace period through a deflection coil, said arrangement including a first sawtooth network comprising a first diode, said deflection coil, a trace capacitor and a retrace capacitor, a second sawtooth network comprising a second diode, a second coil, a second trace capacitor and a second retrace capacitor, the retrace period for the current when flowing through the second coil being approximately equal to the retrace period for the deflection coil, the arrangement also including supply terminals for receiving a supply voltage from a source and a controlled switching arrangement which is non-conducting during the retrace period, said sawtooth networks being connected together such that the first and second diodes are connected in series with the same conductivity direction, the serially arranged diodes being parallel coupled with the controlled switching arrangement, and first control means for varying the voltage across one of the trace capacitors, characterized in that an impedance is provided in one of the sawtooth networks in series with its associated diode, the parallel coupling of the diodes with the controlled switching arrangement being such that the resulting series arrangement of the impedance and the first and second diodes is connected in parallel with the controlled switching arrangement, and second control means for varying the voltage across the said impedance.

2. A circuit arrangement as claimed in claim 1, in which said first control means varies the voltage across one of the trace capacitors at field or a lower frequency for correcting a display error, characterized in that said second control means varies the voltage across the said impedance at line frequency for correcting a further display error.

3. A circuit arrangement as claimed in claim 1, characterized in that said second control means comprises means for producing a signal representing variations in the beam current of a cathode ray display tube associated with said circuit arrangement, means for filtering components at the retrace frequency from said signal and means for applying the resulting filtered signal to the junction of the impedance with its associated diode.

4. A circuit arrangement as claimed in claim 1, in which said first control means varies the voltage across the trace capacitor in said second sawtooth network, characterized in that said impedance is connected to the diode in the said second sawtooth network.

5. A circuit arrangement as claimed in claim 4, in which the signal representing variations in the said beam current is derived from a capacitor carrying the alternating components of the beam current, characterized in that means for differentiating the filtered signal is connected between the means for filtering the said retrace frequency components and the said junction.

6. A circuit arrangement as claimed in claim 2, characterized in that said second control means comprises means for producing a signal representing variations in the beam current of a cathode ray display tube associated with said circuit arrangement, means for filtering components at the retrace frequency from said signal and means for applying the resulting filtered signal to the junction of the impedance with its associated diode.

7. A circuit arrangement as claimed in claim 2, in which said first control means varies the voltage across the trace capacitor in said second sawtooth network, characterized in that said impedance is connected to the diode in the said second sawtooth network.

8. A circuit arrangement as claimed in claim 3, in which said first control means varies the voltage across the trace capacitor in said second sawtooth network, characterized in that said impedance is connected to the diode in the said second sawtooth network.

9. A circuit arrangement as claimed in claim 6, in which said first control means varies the voltage across the trace capacitor in said second sawtooth network, characterized in that said i mpedance is connected to the diode in the said second sawtooth network.

10. A circuit arrangement as claimed in claim 7, in which the signal representing variations in the said beam current is derived from a capacitor carrying the alternating components of the beam current, characterized in that means for differentiating the filtered signal is connected between the means for filtering the said retrace frequency components and the said junction.

11. A circuit arrangement as claimed in claim 8, in which the signal representing variations in the said beam current is derived from a capacitor carrying the alternating components of the beam current, characterized in that means for differentiating the filtered signal is connected between the means for filtering the said retrace frequency components and the said junction.

12. A circuit arrangement as claimed in claim 9, in which the signal representing variations in the said beam current is derived from a capacitor carrying the alternating components of the beam current, characterized in that means for differentiating the filtered signal is connected between the means for filtering the said retrace frequency components and the said junction.

* * * * *